United States Patent [19]

Ghandeharizadeh et al.

[11] Patent Number: 5,490,229
[45] Date of Patent: Feb. 6, 1996

[54] SLIDABLY MOUNTED OPTICAL FIBER DISTRIBUTION TRAY

[75] Inventors: Shahryar Ghandeharizadeh, Bridgewater; Randy A. Reagan, Morris Plains, both of N.J.

[73] Assignee: AT&T IPM Corp., Coral Gables, Fla.

[21] Appl. No.: 311,204

[22] Filed: Sep. 27, 1994

Related U.S. Application Data

[63] Continuation of Ser. No. 163,457, Dec. 8, 1993, abandoned.

[51] Int. Cl.$^6$ .................................................. G02B 6/40
[52] U.S. Cl. .................................................. 385/135
[58] Field of Search .................................. 385/135, 134, 385/137, 138, 147

[56] References Cited

U.S. PATENT DOCUMENTS

| | | | |
|---|---|---|---|
| 4,898,448 | 2/1990 | Cooper | 385/135 |
| 4,900,123 | 2/1990 | Barlow et al. | 385/135 |
| 5,071,211 | 12/1991 | Debortoli et al. | 385/76 |
| 5,093,887 | 3/1992 | Witte | 385/135 |
| 5,115,489 | 5/1992 | Norris | 385/135 |
| 5,129,030 | 7/1992 | Petrunia | 385/135 |
| 5,142,606 | 8/1992 | Carney et al. | 385/134 |

*Primary Examiner*—Akm E. Ullah
*Attorney, Agent, or Firm*—Lester H. Birnbaum

[57] ABSTRACT

Disclosed is an optical fiber distribution apparatus with slide-out trays including optical connectors and splice trays mounted thereon. Each tray has a hinged protective cover and a front portion which drops down to provide access to the connectors. The splice tray is mounted on a platform elevated from the tray so that fibers coming into the tray can be stored in the gap formed thereby.

13 Claims, 4 Drawing Sheets

SLIDABLY MOUNTED OPTICAL FIBER DISTRIBUTION TRAY

This application is a continuation of application Ser. No. 08/163,457 filed on Dec. 8, 1993, now abandoned.

BACKGROUND OF THE INVENTION

This invention relates to optical fiber trays used in fiber distribution flames.

Optical fiber distribution frames are important components in telecommunications systems as an interface between optical fiber feeder (trunk) and distribution (transmission) cables. Typically, the feeder cables are fed into each tray of the frame from the back or side of the tray in the form of bundled fibers covered by protective tubing. The individual fibers are spliced to fiber pigtails on a splice tray, and optical connectors on the opposite ends of the pigtails are mounted in a panel near the front of the tray (see, e.g., U.S. Pat. No. 5,071,211 issued to Debortoli et al. and U.S. Pat. No. 4,898,448 issued to Cooper). Jumper cables are optically connected to the pigtail fibers by means of the connectors at the front of the trays for optical connection to other equipment.

In such frames, it is desirable to provide as high a density of fibers and connectors as possible while still permitting easy access to the connectors and splice trays for proper maintenance. For access purposes the fiber trays are usually slidable within a shelf, and can include a drop-down portion for access to the connectors (see, e.g., U.S. Pat. No. 5,129,030 issued to Petrunia and U.S. Pat. No. 5,071,211 issued to Debortoli et al.).

The use of movable trays can create problems as to how or where excess fiber can be stored within the apparatus, especially in high density applications. A further concern is how to protect the connectors and splices in a manner consistent with easy access.

In lightguide cross-connection applications typically used in central offices, the feeder cables are fed into the trays from the back. However, for interconnection applications such as typically used for cable television, the feeder cables are usually provided in the front of the trays. It is desirable, therefore, to provide a tray which can receive a cable from the front or back of the frame.

SUMMARY OF THE INVENTION

In accordance with one aspect, the invention is an optical fiber distribution tray adapted for slidable mounting within a shelf of a distribution frame. Each tray includes a front and rear portion. The rear portion includes a plurality of optical connectors. The front portion includes means for distributing optical fibers coupled to said connectors and comprises a base member and a front surface essentially perpendicular thereto. The base member is mounted by means of hinges to the rear portion of the tray. A cover is mounted by means of hinges to the front surface of the distributing means so as to be essentially parallel to the base member and provide protection for the fibers and connectors.

In accordance with a further aspect, the invention is an optical fiber distribution tray adapted for slidable mounting within a shelf of a fiber distribution frame. Each tray includes a front portion and a rear portion. The rear portion includes a base member and a platform mounted to the base member. A gap is provided between the platform and base member to form a compartment having sufficient size to permit optical fibers coming into the tray to be stored therein and to permit the fibers to slide out of the compartment as the tray is slid out of its shelf.

BRIEF DESCRIPTION OF THE DRAWING

These and other features of the invention are delineated in detail in the following description. In the drawing.

It will be appreciated that, for purposes of illustration, these figures are not necessarily made to scale.

DETAILED DESCRIPTION

Figure 1:
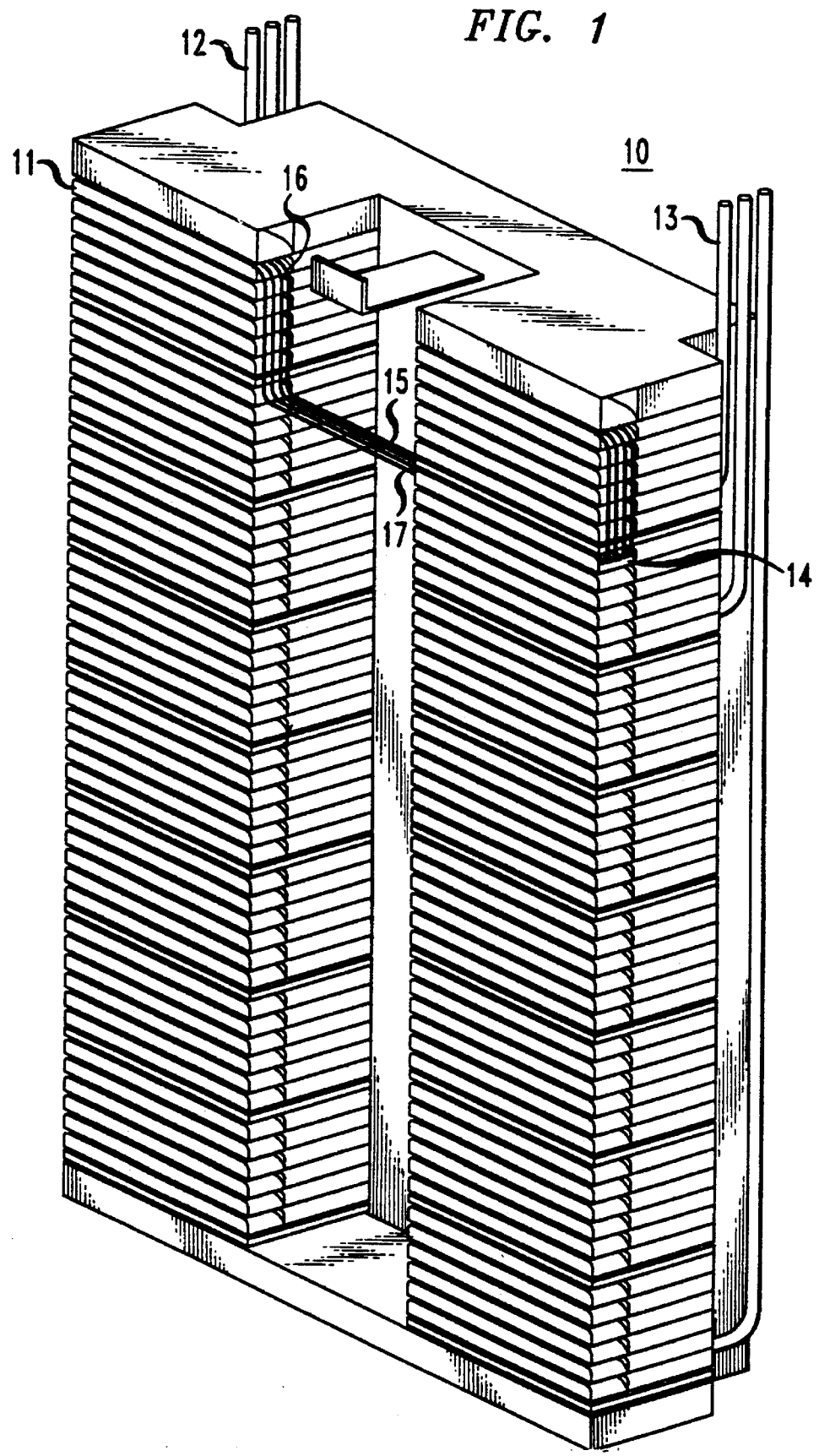
FIG. 1 is a perspective view of an optical fiber distribution frame in accordance with an embodiment of the invention.

FIG. 1 illustrates a fiber distribution frame, 10, which utilizes an embodiment of the invention. The frame includes a plurality of shelves, e.g., 11 and 14, which, in this example, are arranged in two columns. Each shelf includes a plurality of trays, to be described, where optical fibers from a trunk cable 12 or transmission cable 13 are connected with jumper fibers, e.g., 15, for purposes of cross-connection between the cables. Typically, the trunk cable 12 or transmission cable 13 is brought into the frame at the back and fibers from the cable are introduced into each tray through an aperture which can be located at the front or rear of the shelves.

For purposes of illustration, a set of jumper fibers, 15, are shown connected from the tray in shelf 11 through an aperture 16 to the tray in shelf 14 through an aperture 17. Of course, any fiber from the trunk cable can be cross-connected with any fiber from the transmission cable through jumpers between appropriate shelves.

The particular distribution frame illustrated is designed to be mounted to a frame in the central office for lightguide cross-connect applications. It will be appreciated that the invention is equally applicable to interconnect applications where the cables as well as the jumper fibers are positioned at the front of the shelves.

Figure 2:
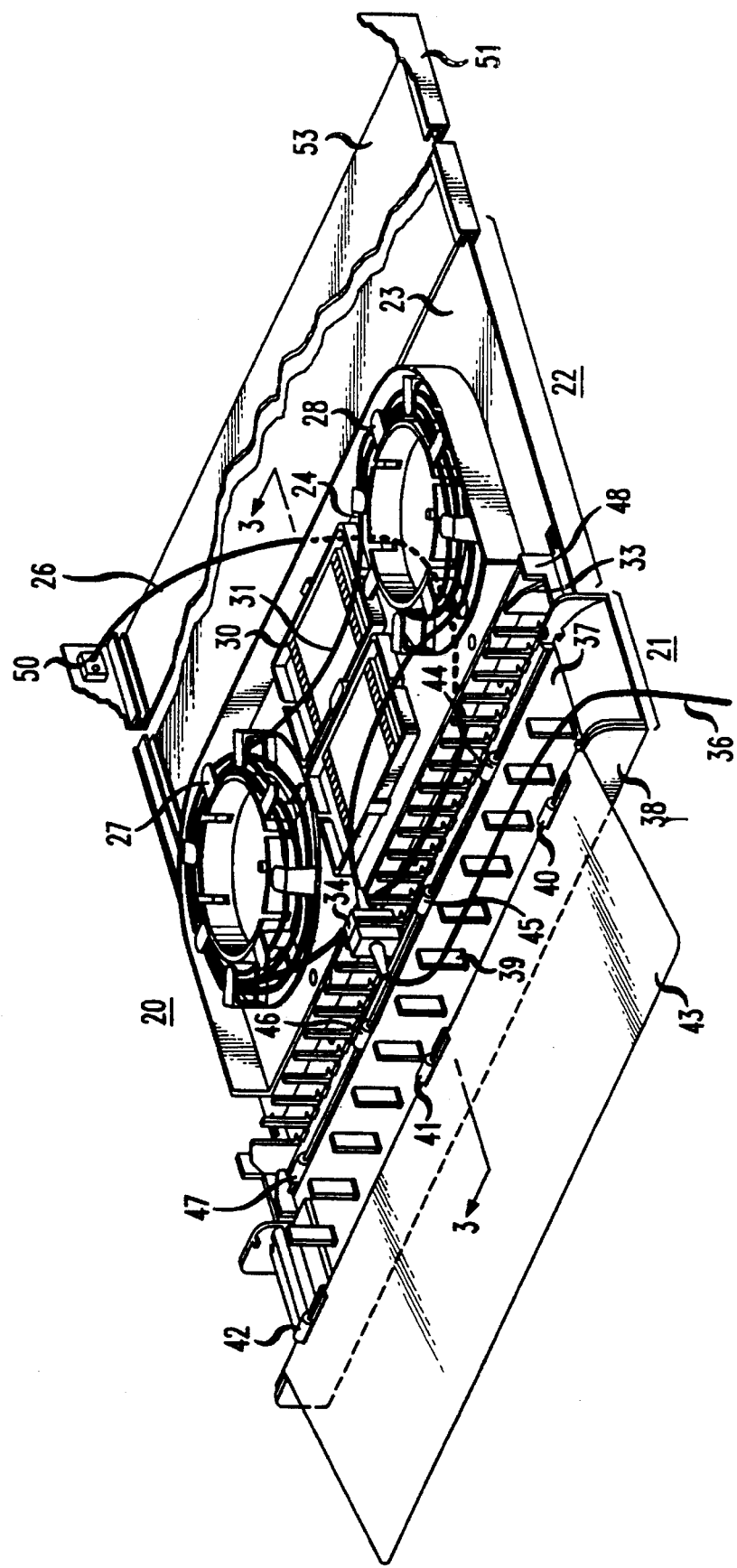
FIG. 2 is a perspective view of a tray and shelf in accordance with an embodiment of the invention which are part of the frame of FIG. 1.
Figure 3:
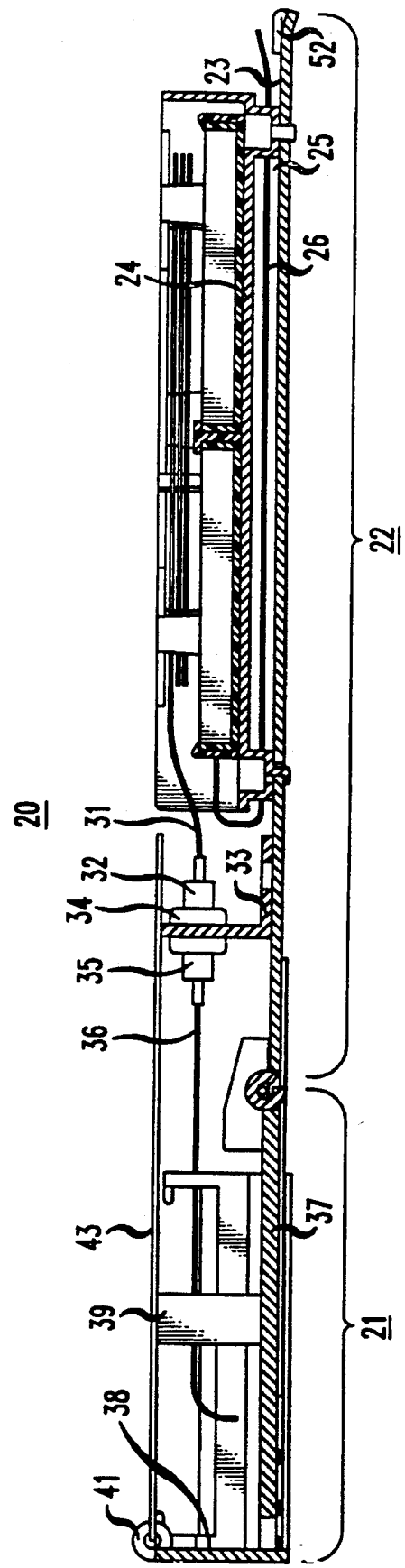
FIGS. 3 and 4 are cross-sectional views of the tray taken along line 3—3 of FIG. 2.
Figure 4:
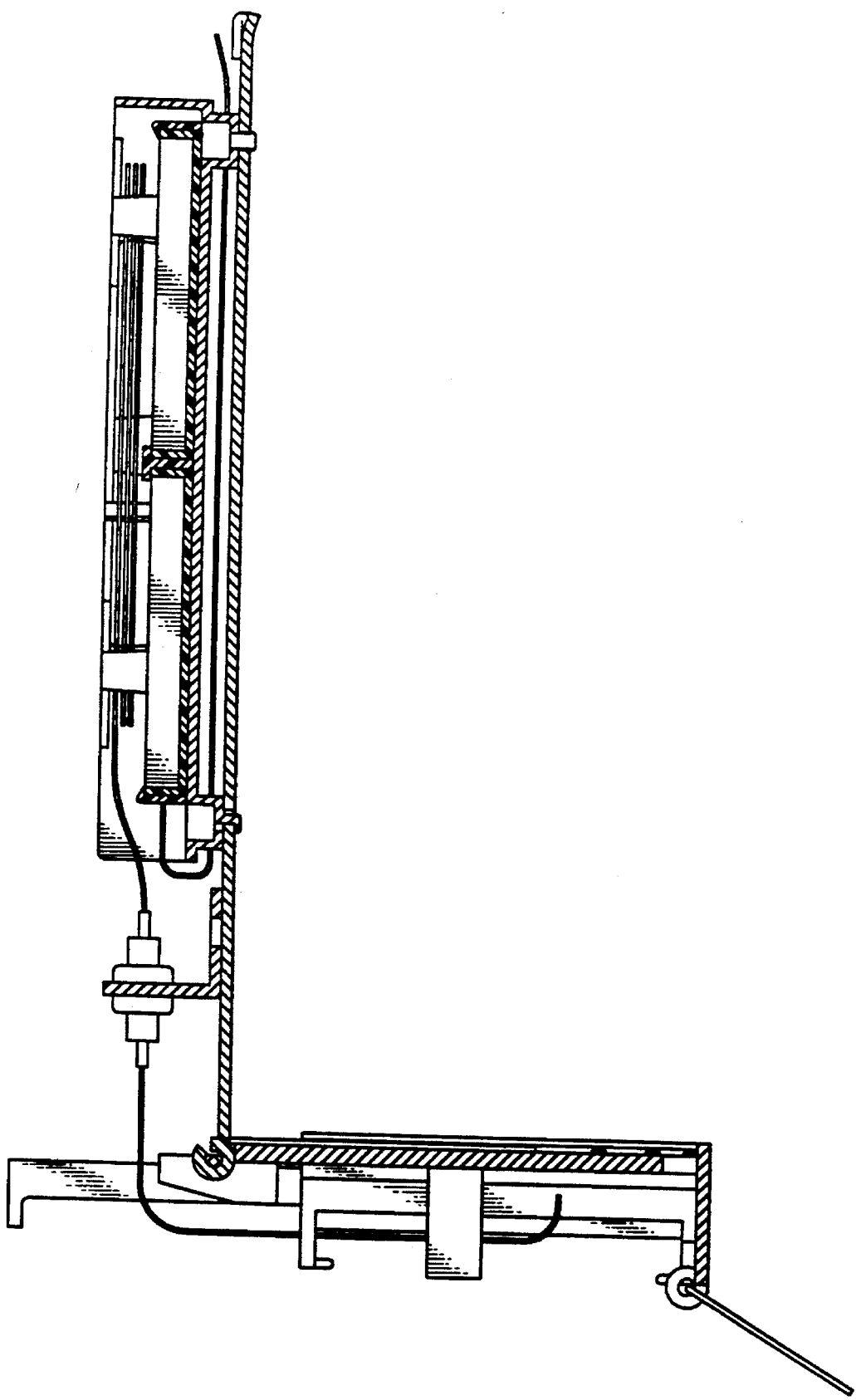

An example of a slide-out tray is illustrated in the perspective view of FIG. 2 and the cross-sectional views of FIG. 3 and 4. The tray 20 includes a front portion, 21, and a rear portion, 22. The rear portion 22 includes a base member, 23, which is capable of sliding into grooves in the shelf (e.g., 51). A raised platform, 24, is mounted to the base 23 so as to form a compartment, 25, therebetween of sufficient height to provide room to store the fibers from the feeder cable (12 of FIG. 1) which are brought into the shelf 51 through an aperture, 50, in the shelf. The fiber usually comes into the shelf protected by an outer tubing. Only one such fiber, 26, is shown in FIGS. 2 and 3 for clarity in the illustration. Typically, the height of the compartment 25 would be in the range 0.5–0.65 cm.

The platform 24 includes on its top surface a pair of drums, 27 and 28, which are adapted for storing additional lengths of optical fiber. In this example, drum 27 receives the fiber 26 from the compartment 25 as it exits the compartment at its forward end. Mounted between the drums is a standard splice tray, 30, for joining fiber 26 to a pigtail fiber, 31, which is stored on drum 28. Again, it will be appreciated that several incoming fibers will be joined to several corresponding pigtail fibers, but these additional fibers are not shown for purposes of clarity. As the term "pigtail fiber" connotes, the opposite end of fiber 31 terminates in an optical connector 32 which can be a standard type, such as an ST connector.

A bulkhead, 33, is mounted near the front of the base 23. The bulkhead includes a plurality of apertures which receive therein corresponding sleeves, only one of which is shown as 34, for providing optical connection between the pigtail connectors and corresponding connectors coupled to jumper fibers. Again, only a single jumper fiber, 36, with a connector, 35, coupled thereto is shown optically connected to pigtail fiber 31.

The front portion 21 of the tray also includes a base member, 37. Attached thereto, or integral therewith, is a front surface, 38, which is essentially perpendicular to the base 37. Both sides of the base member 37 are open to permit the exit of jumper fibers (e.g., 36) from the tray. A series of posts, e.g., 39, is provided on the base member 37 adjacent to the bulkhead 33. By threading a plurality of jumper fibers through each space between the posts, strain relief is provided for the fibers.

Mechanically coupled by means of hinges 40–42 to the top of the front surface 38 is a cover, 43, shown in an open position in FIG. 2 and in a closed position in FIG. 3.

The base member 37 of the front portion 21 is mechanically coupled to the base member 23 of the rear portion 22 by means of hinges 44–47. As shown in FIG. 4, this hinged attachment of the front and rear portions permits the front portion 21 to drop down and provide easy access to the connectors in the bulkhead 33.

While the tray 24 is within its shelf, 51, the cover 43 is closed (as shown in FIG. 3) so as to protect the jumper fibers 36, the connectors 32 and 35, and sleeves 34 from getting damaged. As also shown in FIG. 3, the incoming fibers, e.g., 26, will be coiled in the compartment 25 formed between the base member 23 and the platform 24. Typically, approximately 24 inches (61 cm) of fiber length will be stored. Generally, the length of each fiber in the compartment will be 50–70 cm. When the tray is pulled out of the shelf, the stored fiber 26 will automatically slide out of the compartment 25 and come to rest on the floor 53 of the shelf. Thus, the tray can be pulled out with a minimum of disturbance to the fiber. When the tray is extended sufficiently, the cover 43 can be pivoted to the open position and the front portion 21 pivoted downward to provide access to the connectors (e.g., 35). At this stage, the splice tray 30 can remain within the shelf boundaries. If it is desired to access the splice tray 30, the tray 20 can be pulled out to its fully extended position (FIG. 2).

It will also be noted that the front portion 21 may be kept in its horizontal position by means of latches, e.g., 48, coupled to the bulkhead 33. This permits the portion 21 to remain horizontal even when the tray is pulled out to its fully extended position so that the cover 43 will protect the connectors while a craftsperson has access to the splice tray in the rear portion. When it is desired to slide the tray back into the shelf, the uncoiled fiber (26) will automatically slide back into and coil itself within the compartment 25. This operation is aided by the edge 52 of the tray which is slightly bent downward to "shovel" the fiber 26 back into the compartment.

A further desirable feature is the use of hinges 44–47 which are easily removed from the base 23 of the rear portion 22 by an upward rotation of the front portion from its horizontal position. The removal of the front portion permits the rear portion to be slid out of the front or back of the shelf so that a craftsperson can work on the splices or connectors at some work surface removed from the shelf.

Various modifications of the invention will become apparent to those skilled in the art. All such variations which basically rely on the teachings through which the invention has advanced the art are properly considered within the scope of the invention.

We claim:

1. An optical fiber distribution tray adapted for slidable mounting within a shelf of a distribution frame comprising:

a rear portion including a plurality of optical connectors;

a front portion including means for distributing optical fibers coupled to said connectors comprising a base member and a front surface perpendicular thereto, the base member being mounted by means of hinges to the rear portion of the distribution tray; and a cover mounted by means of hinges to the front surface of the distributing means so as to be parallel to the base member in a closed position and provide protection for the fibers and connectors.

2. The tray according to claim 1 wherein the front portion is capable of dropping down at an angle to the rear portion when the tray is slid at least partly out of the shelf and the cover is rotated so as to provide access to the connectors.

3. The tray according to claim 1 wherein the front portion is latched to the rear portion so as to permit the front and rear portion to lie in essentially the same plane when the tray is slid out of the shelf.

4. The tray according to claim 1 wherein the front portion is removably mounted to the rear portion.

5. The tray according to claim 1 wherein the distributing means further comprises a plurality of posts mounted to the base member to provide strain relief for the fibers.

6. The tray according to claim 1 wherein the rear portion includes a second base member and a platform mounted thereon with a gap therebetween which forms a compartment having a sufficient size to permit optical fibers coming into the tray from the shelf to be stored therein.

7. The tray according to claim 6 wherein a splice tray is mounted to the top of the platform for splicing said incoming fibers to pigtail fibers also mounted on the platform.

8. An optical fiber distribution tray adapted for slidable mounting within a shelf of a fiber distribution frame comprising:

a rear portion including a base member and a platform mounted to the base member with a gap formed therebetween to form a compartment having sufficient size to permit optical fibers coming into the tray to be stored therein and to permit the fibers to slide out of the compartment as the tray is slid out of the shelf.

9. The tray according to claim 8 further comprising a splice tray mounted on a top surface of the platform, said splice tray providing splices for the incoming fibers to fiber pigtails also mounted on the top surface.

10. The tray according to claim 8 wherein the length of each fiber stored in the compartment is within the range 50–70 cm.

11. The apparatus according to claim 8 wherein the gap is within the range 0.5–0.65 cm.

12. The tray according to claim 9 further comprising drums formed on said top surface to store additional amounts of said incoming fibers and said pigtail fibers.

13. The tray according to claim 8 wherein the base member includes a downwardly extending edge portion to scoop up the fiber as the tray is slid into the shelf.

* * * * *